3,203,964
PREPARATION OF LEVULINIC ACID ESTERS FROM FURFURYL ALCOHOL
George W. Huffman, Crystal Lake, and Earl K. Stigger, Arlington Heights, Ill., assignors to The Quaker Oats Company, Chicago, Ill., a corporation of New Jersey
No Drawing. Filed Nov. 6, 1961, Ser. No. 150,138
5 Claims. (Cl. 260—347.4)

This invention relates to a process for the manufacture of levulinic acid esters.

In United States Letters Patent No. 2,763,665, which issued September 18, 1956, to Ritchie Hart Lock and Kenneth Reynolds, there is disclosed a particularly advantageous method for the manufacture of levulinic acid esters, which esters are useful for various purposes, for example, as plasticizers or solvents, or as intermediate products for the manufacture of the free acids by hydrolysis with water or of salts of the acid by hydrolyzing the esters with metal compounds of alkaline reaction. Calcium levulinate, for example, is of special importance in calcium therapy or dietetics.

The process of the above Lock et al. patent comprises heating furfuryl alcohol at a temperature within the range of 64° C. to 220° C. with a different alcohol selected from the group consisting of unsubstituted primary and secondary carbon chain and oxygen-carbon chain aliphatic and carbon ring and oxygen-carbon ring cycloaliphatic alcohols containing from 1 to 10 carbon atoms under substantially anhydrous conditions with agitation in the presence of a catalyst selected from the group consisting of hydrogen chloride and hydrogen bromide, and gradually adding the furfuryl alcohol to the other alcohol at a rate such that at no time does the amount of unreacted furfuryl alcohol present exceed 2 per cent by volume of the other alcohol, and using more than 4 molecular proportions of the said other alcohol per molecular proportion of the furfuryl alcohol used.

The process of the present invention constitutes a further improvement of the Lock et al, process described in United States Patent No. 2,763,665 and affords a number of unexpected and important advantages. In accordance with the present invention, levulinic acid esters are prepared by a process which comprises heating furfuryl alcohol at a temperature within the range of 64° to 220° C. with a different alcohol selected from the group consisting of unsubstituted primary and secondary carbon chain and oxygen-carbon chain aliphatic and carbon ring and oxygen-carbon ring cycloaliphatic alcohols containing from 1 to 10 carbon atoms in the presence of a small amount of water and a catalyst selected from the group consisting of hydrogen chloride and hydrogen bromide. The furfuryl alcohol is added to the other alcohol gradually and preferably at a rate such that at no time does the amount of unreacted furfuryl alcohol present exceed 2 percent by volume of the other alcohol, and most preferably 0.5 to 1 percent by volume of the other alcohol. Preferably the furfuryl alcohol is premixed with a portion of the other alcohol to be employed before addition to the reaction mixture. This premixture of alcohols can be added at a rate which affords the desired concentration of furfuryl alcohol in the reaction mixture. Moreover, it offers a means of achieving lower local concentrations of furfuryl alcohol than can be obtained with the same degree of agitation if the furfuryl alcohol is added without previous dilution with the other alcohol. The effect of either high local or high general concentration of furfuryl alcohol is loss of yield of desired product.

As indicated, in the process of the present invention a small amount of water is present in the reaction mixture, which leads to a number of important processing advantages. When operating under essentially anhydrous conditions, the acid catalyst may be quite rapidly coverted to the alkyl chloride corresponding to the alcohol used, resulting in loss of the alcohol as well as catalytic activity. For example, with n-butyl alcohol it has been found that about 50% of the titratable acidity may be lost during sixty minutes at reflux in carrying out the reaction under substantially anhydrous conditions. Also, under anhydrous conditions care must be exercised that overly long reflux times are not employed before or during the addition of furfuryl alcohol, inasmuch as the catalyst may be converted to the alkyl halide to such an extent that the required catalytic activity is lost. On the other hand, with small amounts of water present, as taught in the present process, 85% to 90% of the titratable acidity generally remains after a 30-minute furfuryl alcohol addition time and thirty minutes at reflux. Even with considerably longer furfuryl alcohol addition times, a large share of the catalyst remains. For example, after a furfuryl alcohol addition time of two or three hours, about 75% of the catalyst generally remains.

The water which is required in the process of the present invention can be advantageously incorporated with either the acid catalyst or with the other alcohol, i.e., the alcohol other than furfuryl alcohol. This is advantageous in that absolute dehydration of the other alcohol employed is not required, and also in that commercially available aqueous hydrogen chloride and hydrogen bromide catalysts can be used rather than the dry, gaseous materials. The amount of water which is to be employed in the process is fairly critical in order to achieve high yields of the desired levulinic acid esters. Generally the amount of water employed corresponds to from about 0.5 to 4% of the weight of the other alcohol. When the amount of water present substantially exceeds the indicated maximum, reduced yields are obtained.

Towards the end of the addition of the furfuryl alcohol, and after the addition is complete, the concentration of the other alcohol must be sufficient to maintain an adequate rate of reaction. When operating as described herein, the amount of the other alcohol required is reduced considerably, affording important additional operating economies. It has been found that in the present process the other alcohol can be used in amounts as low as two moles of the alcohol for each mole of furfuryl alcohol. Because of this low alcohol ratio, smaller reactors can be employed for a given value of production per unit time. It allows further processing economies in that the amount of the other alcohol in excess of that required and which must be removed from the ester product is considerably reduced. Generally the molar ratio of the other alcohol to furfuryl alcohol is within the range from about 2:1 to about 6:1. By gradually adding the furfuryl alcohol to the other alcohol, the yield of the levulinic acid ester, calculated on the furfuryl alcohol used, is substantially greater than that obtained when the whole of the furfuryl alcohol is present at the outset under otherwise similar reaction conditions. Preferably, the rate of addition of furfuryl alcohol should not exceed about .03 mole of furfuryl alcohol per minute per mole of the other alcohol. Furthermore, premixing of a portion of the other alcohol with the furfuryl alcohol before addition to the reaction mixture aids in the rapid dispersion of the furfuryl alcohol and results in avoidance of high local concentrations of furfuryl alcohol.

As the primary or secondary alcohol to be reacted with furfuryl alcohol there can be an aliphatic alcohol, for example, methanol, ethanol, n-propanol, isopropanol, n-butanol, isobutanol, n-pentanol, isopentanol, n-hexanol, n-octanol, n-nonyl alcohol or n-decanol; an alkoxyethanol, for example, β-methoxy-ethanol or β-ethoxy-ethanol; or a cycloaliphatic alcohol, for example, cyclohexanol or tetrahydrofurfuryl alcohol.

The attainment of a high yield is also favored by working at a temperature not less than about 90° C. The reaction is advantageously carried out by adding the furfuryl alcohol to the other alcohol while the latter is maintained at the boil. It is generally most convenient to maintain the alcohol at the boil under atmospheric pressure, although a lower or higher pressure may be used, if desired.

The hydrogen chloride or hydrogen bromide used as catalyst is present in the alcohol to which the furfuryl alcohol is added and advantageously the concentration of the hydrogen halide in the former alcohol ranges from 0.4–0.8 part by weight per 100 parts by volume of the alcohol.

The process of the invention may also be carried out in a continuous manner by continuously withdrawing a part of the reaction mixture during the reaction and the addition of furfuryl alcohol, and adding fresh amounts of the other alcohol and hydrogen chloride or hydrogen bromide to replace the loss of these constituents caused by the reaction mixture withdrawn. In this manner the concentration of the other alcohol in the reaction mixture and the excess of that alcohol over unreacted furfuryl alcohol can be maintained substantially constant at favorable values so as to ensure the maintenance of a high yield throughout a continuous run of the process. The reactants are preferably agitated during the course of the reaction by any suitable means.

The following examples further illustrate the invention but are not to be construed as limitative thereof.

EXAMPLE 1

HCl gas was added to butanol (804 g.) in a flask. Titration showed 6.06 g. HCl was present. The solution was heated to reflux as rapidly as possible and freshly distilled furfuryl alcohol (196 g.) was added at a constant rate over 31 minutes. The solution was refluxed an additional 30 minutes. Upon cooling and titrating, 3.18 g. of HCl remained as titratable acidity.

A companion experiment was run in an identical manner except that the catalyst was added as 17 g. of aqueous hydrochloric acid. By titration 6.54 g. of hydrogen chloride was present before heating. After adding the furfuryl alcohol over 30.5 minutes and refluxing another 30 minutes, titration showed 5.82 g. of hydrogen chloride was present.

The same yield of butyl levulinate was obtained from each of the above two runs.

It has been found that the major portion of the hydrogen chloride loss is due to butyl chloride formation. Calculation will show that four times as much butanol is lost in this manner under the anhydrous conditions as in the second example where some water is present.

EXAMPLE 2

Freshly distilled furfuryl alcohol (392 g. or 4 moles) was introduced continuously at a uniform rate over the course of 90 minutes into butanol (800 g. or 10.8 moles) containing 18 g. of 37% aqueous hydrochloric acid and varying amounts of water, the butanol being maintained at reflux and vigorously agitated during the course of the addition. After the addition was complete, reflux was continued for one hour. The excess butanol was distilled from the mixture under a pressure of 5 mm. of mercury at about 35° C., and then the butyl levulinate was distilled at the same pressure. Table I shows the amount of tars left on distillation with varying water concentrations in the butanol.

Table I

| Mole Ratio, Butanol:FA | Total Water Present in Butanol, percent | Tars Left on Distillation as Percent of Theoretical Yield, percent |
| --- | --- | --- |
| 5.4:1 | <0.5 | 3.5 |
| 2.7:1 | 1.70 | 3.8 |
| 2.7:1 | 2.66 | 4.3 |
| 2.7:1 | 3.42 | 4.1 |
| 2.7:1 | 4.44 | 4.8 |
| 2.7:1 | 5.39 | 5.6 |
| 2.7:1 | 6.37 | 6.1 |

As seen, when water was employed in amounts more than 0.5 and less than 4.44% by weight of butanol, less butanol is coverted to undesired product and with no appreciable increase in residue tar.

EXAMPLE 3

Varying amounts of freshly distilled furfuryl alcohol were introduced continuously at a uniform rate over the course of 90 minutes into butanol (800 g. or 10.8 moles) containing 18 g. of 37% concentrated hydrochloric acid, the butanol being maintained at reflux and vigorously agitated during the course of the addition. The butanol contained less than 0.5% water except for that added with the hydrochloric acid. After one hour of additional reflux, the ester was recovered as in Example 1. High yields of butyl levulinate were obtained until the mole ratio of butanol to furfuryl alcohol dropped below about 2.2:1.

EXAMPLE 4

Three hundred ninety-two (392) grams of freshly distilled furfuryl alcohol was added at a uniform rate over 90 minutes to rapidly agitated tetrahydrofurfuryl alcohol (10.8 moles) acidified with 18 g. of 37% hydrochloric acid and maintained at 105–110° C. The temperature was maintained for one hour after the addition of tetrahydrofurfuryl alcohol was complete. On distillation, 659 g. of tetrahydrofurfuryl levulinate fraction was isolated.

EXAMPLE 5

The procedure was identical with Example 4 except β-butoxy-ethanol (10.8 moles) was used instead of tetrahydrofurfuryl alcohol. The recovered β-butoxy-ethyl levulinate fraction amounted to 89% of theory.

EXAMPLE 6

Freshly distilled furfuryl alcohol (4 moles) was added at a uniform rate over 60 minutes to refluxing isobutanol acidified with 17.5 g. of 37% hydrochloric acid solution. After an additional hour or reflux, the isobutyl levulinate is isolated by distillation.

EXAMPLE 7

Freshly distilled furfuryl alcohol (392 g.) is added over 60 minutes to rapidly agitated cyclohexanol (1080 g.) acidified with commercial 37% hydrochloric acid (19 g.) while the temperature is maintained at 110° C. After the addition the temperature is maintained for 30 minutes. On distillation a cyclohexyl levulinate fraction is obtained.

It is apparent that the foregoing described process for producing levulinic acid esters possesses numerous advantages. Some of the outstanding advantages of the process are (1) minimum alcohol requirements, (2) improved catalyst efficiency, (3) high yields of desired ester product, and (4) reduced possibility of undesired polymerization reactions.

Those modifications and equivalents which come within the spirit of the invention and scope of the appended claims are to be considered part of the invention.

We claim:

1. In a process for the manufacture of levulinic acid esters which comprises heating furfuryl alcohol at a temperature within the range of 64° C. to 220° C. with a second alcohol selected from the group consisting of tetrahydrofurfuryl alcohol, cyclohexanol, and unsubstituted saturated primary and secondary carbon chain and oxygen-carbon chain aliphatic monohydric alcohols containing from 1 to 10 carbon atoms in the presence of a catalyst selected from the group consisting of hydrogen chloride and hydrogen bromide and gradually adding the furfuryl alcohol to the second alcohol at a rate that at no time does the amount of unreacted furfuryl alcohol exceed about 2 percent by volume of the second alcohol, and using not less than about two to not more than about four; molecular proportions of the said second alcohol per molecular proportion of the furfuryl alcohol used, the improvement which consists in carrying out said process in the presence of water with the amount of water employed being more than about 0.5 percent and not substantially in excess of about 4 percent by weight of said second alcohol.

2. A process according to claim 1 wherein the furfuryl alcohol is premixed with a portion of said second alcohol prior to the gradual addition of the furfuryl alcohol.

3. A process according to claim 1 wherein the said second alcohol is tetrahydrofurfuryl alcohol.

4. A process according to claim 1 wherein the said second alcohol is cyclohexanol.

5. A process according to claim 1 wherein the said second alcohol is butyl alcohol.

References Cited by the Examiner

UNITED STATES PATENTS 2,763,665   9/56   Lock et al. _____ 260—483

FOREIGN PATENTS 857,953   12/52   Germany.

OTHER REFERENCES

Pummerer et al., Berichte der Deutschen Chemischen Gesellschaft, Jahrgang 56, pages 999–1008 (1923).

LORRAINE A. WEINBERGER, *Primary Examiner.*

DANIEL D. HORWITZ, LEON ZITVER, *Examiners.*